Sept. 15, 1964 R. KOJAC 3,148,440
METHOD OF COUPLING PNEUMATIC DISPATCH CONDUITS
Filed Feb. 20, 1961
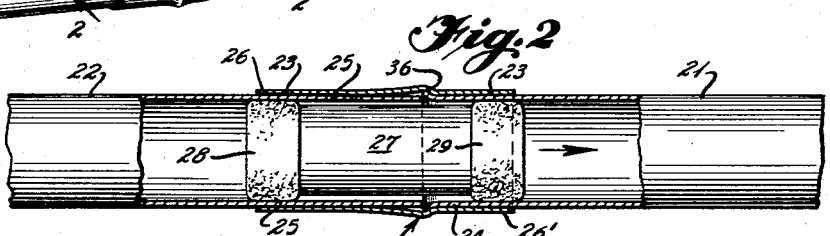
INVENTOR
Robert Kojac
BY
ATTORNEY

United States Patent Office 3,148,440
Patented Sept. 15, 1964

3,148,440
METHOD OF COUPLING PNEUMATIC
DISPATCH CONDUITS
Robert Kojac, Box 481, Saddle Brook, N.J.
Filed Feb. 20, 1961, Ser. No. 90,573
2 Claims. (Cl. 29—157)

This invention relates to a method of making pneumatic conduit couplings, more particularly, the invention relates to a method of making sleeve type couplings for connecting sections of pneumatic dispatch conduits together in air tight relation, and to the method and apparatus for performing the coupling operation.

Heretofore, it has been an accepted practice in the field of assembling and installing pneumatic dispatch conduits for operation in departmental stores and the like, to couple the conduit sections together with sleeve type couplings, by first ball peening the remote ends of the conduit sections thereby slightly enlarging the end portions so that the sleeve type coupling may then be slipped tightly over the connecting ends of the conduit sections. This ball peening is normally necessary because of the fact that the tolerances in the coupling and sleeve, as manufactured normally varied to a certain extent. In addition sealing cement is normally applied to the end portions prior to attaching the sleeve coupling.

However, this procedure of coupling the conduit sections together by first ball peening the end sections, consumes a substantial amount of time. The ball peening and attaching for each coupling may take as much time as one half hour. Accordingly, in a department store installation, where a considerable number of sections are coupled together; according to this past practice, the total time expended becomes quite costly.

It is an object of this invention to overcome the deficiencies of such prior practices and to provide a novel, rapid method of effectively coupling the conduit sections together in only several minutes time.

It is a further object of the invention to provide a novel method of coupling pneumatic conduit section which includes one end of one conduit section being flared outwardly, and an annular ridge in the coupling for receiving the flared portion and providing a positive connection between the one end of the conduit and the sleeve.

It is a further object of the invention to provide a novel improved method of coupling pneumatic dispatch conduit sections together with sleeve type coupling which includes deforming the end of one of the conduits outward and creating corresponding bulge in the coupling, thereby providing a positive connection therebetween, and thereafter mounting the other conduit section to the other end of the sleeve.

Further objects and advantages to the invention will become apparent as the description proceeds and when taken in conjunction with the accompanying drawings, wherein:

FIG. 1 is a general perspective view of the pneumatic dispatch conduit invention disclosing the deformable ridge sleeve couplings;

FIG. 2 is an enlarged detached sectional view taken along line 2—2 of FIG. 1, disclosing the interior of the coupling and conduits, and revealing a dispatch cartridge therein;

FIG. 3 is a perspective view of the mandrel employed to create the coupling connection;

FIG. 4 is a perspective view of a relatively heavy metal tablet employed as a floor member to receive the mandrel, when performing the deforming operation;

FIG. 5 is a perspective view of the sleeve type coupling, prior to deformation;

FIG. 6 is a perspective view of one of the conduit sections;

FIG. 7 is a side-cutaway view of the coupling and sleeve, with the mandrel inserted therein, and disclosing their relative positions prior to the deformation operation;

FIG. 8 is a side-cutaway view of the conduit and sleeve, immediately after the deformation operation; and FIG. 9 is a side cut-away view of the conduit and coupling, after the deformation operation, with the mandrel removed.

Briefly stated the invention comprises an apparatus and method or process for attaching pneumatic conduit sections together with a sleeve coupling, by telescoping the sleeve over the end of one of the conduit sections, and inserting a mandrel, having a tapered shoulder, into the sleeve, and thereafter dropping the conduit, sleeve and mandrel, as an assembly, onto a metal plate one or more times. The dropping of the assembly causes the mandrel to first engage the plate, with the blow of engagement forcing the mandrel upward in the sleeve, and to engage the remote edge of the conduit, as well as deform the edge of the conduit outward in an annular skirt conformation. The forcing of the edge of the conduit outward also creates an annular ridge in the sleeve, thereby locking the conduit section to the sleeve. Thereafter the mandrel is removed and the other conduit section is inserted into the other end of the sleeve.

The invention further includes a pneumatic conduit coupling which comprises a continuous sleeve coupling which surrounds the adjacent ends of a pair of conduit sections, with an annular ridge formed in the coupling, and one of the conduits having its end portion flared outward in an annular skirt, and extending into the annular ridge of the sleeve.

With further more detailed reference to the drawings, in FIG. 1, a plurality of annularly ridge sleeve couplings 20, are illustrated with their interconnecting conduit sections 21 and 22. In FIG. 2, the details of the invention are shown on an enlarged scale. The conduit members 21 and 22 are surrounded by a thin layer of sealing cement 23, along their end portions 24 and 25, with one end 26' of the coupling encompassing the end portion 24 of the conduit 21, and the other end portion 26 of the coupling encompassing the end portion 25 of the conduit 22.

With the conduit and coupling is a conventional pneumatic cartridge 27, having felt bumper guards 28 and 29, at its remote ends and illustrated as traveling in the direction of the arrow.

The one end 26 of the coupling is illustrated as substantially greater in length than the other end 26' of the coupling, when measured from the annular ridged portion 30.

The mandrel 31 for deforming the couplings into their ridged configuration, is best illustrated in FIG. 3 and it comprises a reduced cylindrical neck portion 32 having an external diameter generally corresponding to, although fractionally smaller, than the inner diameter of the conduit section 21. The mandrel also has a tapered portion 33, which is tapered outward and downward at approximately a 16° angle (16 degree) toward an enlarged cylindrical body portion 34, and the body portion 34 has a straight cylindrical external diameter generally corresponding to the inner diameter of the sleeve or coupling 20, although fractionally smaller.

A rectangular metal plate or tablet 35, of sufficient thickness and length to possess substantial weight is illustrated in FIG. 4.

The sleeve, prior to the deformation process, is of a substantially straight cylindrical form, as illustrated in FIG. 5.

*Method of Coupling Pneumatic Conduit Members Together in Air Tight Relation*

In order to couple the conduit sections together, metal conduit member 21, is first coated with conventional sealing cement 23 such as rubber or plastic cement or the like, and the sleeve or coupling 20 is projected or telescoped over the coated end portion 24 of the conduit 21, thereafter the steel mandrel 31 is inserted into the sleeve with its reduced neck portion 32, first, until the annular tapered shoulder portion 33, abuts the edge 36 of the conduit, in the manner illustrated in FIG. 7. When the mandrel has been fully inserted, the reduced cylindrical neck portion 32, will be snugly fitted in the conduit end portion 24, since its diameter is only fractionally smaller than the inner diameter of the conduit; and the enlarged cylindrical body portion of the mandrel will be snugly fitted in the sleeve or coupling, since its diameter also is only fractionally smaller than the inner diameter of the sleeve.

Thereupon, the metal tablet is placed upon the floor, preferably upon or above one of the center beams, assuming the installation is taking place in a department store, in order to provide additional support.

Since the sleeve has been attached, and the mandrel inserted, the entire assembly is held waist or shoulder high and dropped freely upon the metal tablet, in the manner illustrated in FIG. 7.

The dropping of the assembly, produces an abrupt upward blow against the mandrel, forcing the mandrel upward in the sleeve conduit, with the shoulder portion 33, engaging the lower edge 36, of the conduit 21 and deforming it upward, into a flared annular taper as illustrated in FIG. 8. The outward deformation of the edge of the conduit also creates a bulging annular ridge 30 in the sleeve, illustrated in FIG. 8. In order to adequately deform the conduit and sleeve, it may be necessary for the assembly to be dropped upon the tablet or plate 35, a second or third time, although normally, the dropping of the assembly twice is sufficient.

The deformation operation is now complete, and the ridge portion 30, will be provided with inclined side portions 37 and 38, and the inclined side portion 37 of the ridge will be in a substantially parallel plane to the outward annular taper or skirt deformation 36 of the conduit 21, as the flared or tapered portion 36 of the conduit extends annularly about the conduit, and closely conforms to the annular inclined side portion 37 of the annular ridge 30 of the sleeve.

After completion of the deformation process, the mandrel is removed (FIG. 9), and the other cylindrical conduit member 22 is coated with a sealing cement 23, about its end portion 25 and the end portion 25 of the conduit is inserted into the outer end 26 of the coupling or sleeve in the manner illustrated in FIG. 2. The inside edge 39 of the end 26 of the sleeve is preferably tapered to facilitate the insertion of the conduit member 22.

The entire process of sealing, deformation and insertion of the coupling members can be readily accomplished under normal circumstances in approximately five minutes, and a firm air tight seal created.

The one end 26 of the sleeve or coupling 20 is purposely longer than the other end 26′ of the coupling with respect to the ridge portion, to indicate in which direction the cartridges are to be moved or pneumatically projected through the conduit sections. The cartridges 27 are to move from the longer end 26 toward the shorter end 26′, when the conduits are coupled in the manner taught by the invention, so that the inside surface of the outwardly flared tapered portion confronts the oncoming cartridge along an inclined plane, to thereby eliminate an abrupt or blunt edge in the conduit system which might otherwise catch or engage and bring the cartridge to a halt, as it was passing into the end of the conduit section.

The deformation of the sleeve or coupling, by the creation of an annular ridge portion 30 causes a stretching of the metal sleeve at that location, and the stretching as a consequence also produces a slight contraction of the metal surfaces of the sleeve adjacent the ridge portion, namely surface portions 26 and 26′, which reduces their diameter. The slight reduction of the diameter of the end 26 of the coupling or sleeve, facilitates the firm mounting of the conduit end portion 25 of the conduit 22, into the end 26 of the sleeve, as it causes a closer more snugly fitting engagement with the end portion 25 of the conduit when it is inserted into the end 26 of the sleeve.

The contraction feature is of importance in that it eliminates the need to ball peen the end 25 of the conduit 22, to create a close fit, before inserting the conduit end 25 into the sleeve.

The mandrel 31 may also be provided with a hollow bore, extending along its center axis, to reduce the weight of the mandrel so that it may be more readily handled by the operator when performing the deformation operation.

It will be obvious that there are various features and advantages to the invention, in addition to those specifically described, and furthermore, it will be apparent that the invention may be employed to couple members together of a different structure, to serve a similar purpose.

Also, it should be readily understood that various changes or modifications may be made in the invention without departing from the spirit and scope thereof, and that accordingly, it is intended that the invention is not limited to that which is specifically described in the specification and set forth in the drawings, but only as indicated in the appended claims.

What is claimed is:

1. A method of coupling a pair of elongated tubular pneumatic dispatch conduits together which comprises the steps of applying sealer coating to one end portion of one of said pair of conduits along the outer surface thereof, inserting said one end portion of said one conduit midway into one end of a tubular sleeve of a short length with respect to the length of said conduits and having an inner diameter generally corresponding to the outer diameter of the conduits, inserting a mandrel into the other end of the sleeve with a reduced cylindrical neck portion of the mandrel closely corresponding to the inner diameter of the conduit and snugly fitted therein and with an enlarged cylindrical portion of the mandrel corresponding to the inner diameter of the sleeve and snugly fitted therein, and with a tapered portion of the mandrel between the reduced and enlarged portion abutting a remote edge of the one end of the one conduit and with the enlarged cylindrical portion protruding out of said other end of the sleeve, dropping the assembly on the protruding end of the mandrel upon a metal plate with the reaction forcing the mandrel upward and the tapered portion deforming the remote edge of the conduit outward into a flared annular skirt conformation and creating an annular bulge in the sleeve, removing the mandrel, applying a sealer coating to one end of the second one of said pair of conduits along the outer surface, and inserting said end of said second one of said pair of conduits midway into the other end of the sleeve.

2. A method of coupling pneumatic conduit sections together which includes the steps of providing an elongated conduit having one end, applying sealer to said one end of said elongated conduit along the outer surface thereof, inserting said one end of said conduit into one end of a sleeve of a short length with respect to said conduit, inserting a mandrel having an annular tapered edge into the other end of said sleeve so that the mandrel protrudes from the sleeve, dropping the assembly on the protruding end of the mandrel upon a support with the reaction forcing the mandrel upward and forcing its tapered edge against the one end of said elongated conduit with said tapered edge deforming the one end of the conduit into a flared skirt conformation and creating an annular bulge in the sleeve, removing the mandrel, providing another conduit elongated with respect to said sleeve and having one end, applying sealer to said one end of said another conduit along the outer surface thereof, inserting said one end of said another conduit into said other end of said sleeve.

References Cited in the file of this patent

UNITED STATES PATENTS

| | | |
|---|---|---|
| 1,971,117 | Mossberg | Aug. 21, 1934 |
| 2,013,217 | Olmstead | Sept. 3, 1935 |
| 2,216,833 | Barry | Oct. 8, 1940 |
| 2,391,761 | Winn | Dec. 25, 1945 |
| 2,398,788 | Hedrick | Apr. 23, 1946 |
| 2,456,048 | Carpenter | Dec. 14, 1948 |
| 2,974,367 | Doering et al. | Mar. 14, 1961 |
| 3,068,563 | Reverman | Dec. 18, 1962 |

FOREIGN PATENTS

| | | |
|---|---|---|
| 448,919 | Great Britain | June 15, 1936 |